A. R. CRADDOCK.
BELT GUIDE.
APPLICATION FILED OCT. 3, 1918.

1,313,267.

Patented Aug. 19, 1919.

INVENTOR.
Algy R. Craddock
BY
L. L. Westfall.
ATTORNEY.

UNITED STATES PATENT OFFICE.

ALGY R. CRADDOCK, OF HILLYARD, WASHINGTON.

BELT-GUIDE.

1,313,267.　　　　　Specification of Letters Patent.　　Patented Aug. 19, 1919.

Application filed October 3, 1918. Serial No. 256,744.

*To all whom it may concern:*

Be it known that I, ALGY R. CRADDOCK, a citizen of the United States of America, residing at Hillyard, in the county of Spokane and State of Washington, have invented new and useful Improvements in Belt-Guides, of which the following is a specification.

This invention pertains to belt-guides and has for its object to provide a belt-guide which can be easily and readily attached to a gas engine and particularly to an automobile gas engine requiring a fan for cooling purposes. For the purpose of illustration an application of the device has been made in the accompanying drawings to a standard Ford automobile engine. In engines of this character it has been found difficult to prevent the belt from flying off the bearings, and this device is calculated to be applied to the engine without altering the construction of the engine, fan, belt, bearings, or other parts in any way, in such a manner that the belt can not fly off the bearings.

In the accompanying drawings forming a part of this specification,

Figure 1:
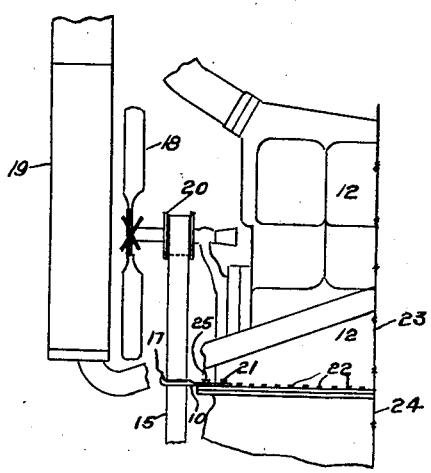
Figure 1, is a side elevation of the front end of an automobile engine, belt, fan and radiator, some of the parts being broken-away, with the invention attached thereto.

In a detail description in which like numerals refer to like parts throughout the several views, the guide consists of a flat plate 10, having one or more openings 11 therethrough for the purpose of providing means for attachment to the engine 12, the contour between the points 13 and 14 being adapted to fit the engine construction so that a rigid attachment may be made thereto, the plate 10 having a contact guide for the side of the belt 15, which comprises a turned over portion 16 of the plate 10 and a contact guide for the edge of the belt 15, which comprises a turned over portion 17 of the plate 10, the same being at right angles to the turned over portion 16.

Figure 2:
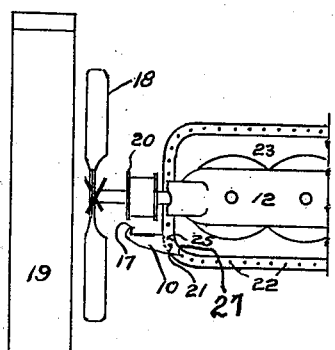
Fig. 2, is a top, plan view of the same.
Figure 3:
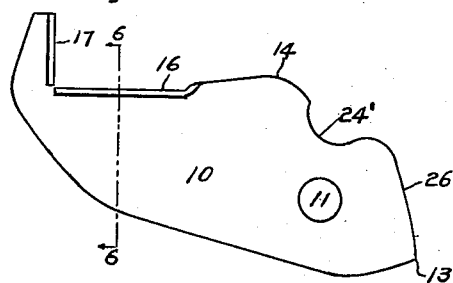
Fig. 3, is an enlarged plan view of the guide detached.
Figure 4:
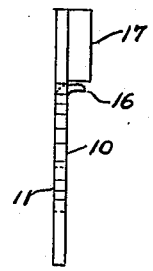
Fig. 4, is a front end view of the same.
Figure 5:
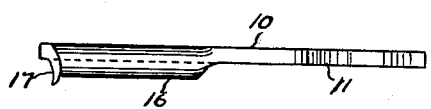
Fig. 5, is a side elevation of the same inverted.
Figure 6:
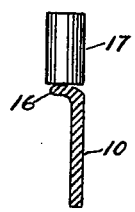
Fig. 6, is a sectional view taken on the line 6—6 of Fig. 3.

As is well understood, the fan 18 is mounted to the rear of the radiator 19 and the belt 15 is mounted on a spool 20 between the fan 18 and the engine 12. The guide plate 10 is secured to the engine as follows. The bolt 21, being one of a set of bolts 22 used to bind together the portions 23 and 24 of the engine frame 12, is removed and the plate 10 placed in the position shown in Figs. 1 and 2. The bolt 21 is then replaced by passing the same through the opening 11 of the plate 10. The portion 24' of the contour of the plate 10, between the points 13 and 14 engages outwardly the bolt head 25 and the portion 26 engages the portion 27 of the engine 12. When thus attached, the belt 15 occupies a position that causes it to run, when in motion, with the edge thereof in close proximity to the portion 17 of the plate 10 and the side thereof in close proximity to the portion 16 of the plate 10. The turned over portions 16 and 17 bring no cutting edges in contact with the belt and thereby prevent the belt from being damaged by the contact. The portion 16 serves to steady the movement of the belt and the portion 17 serves to prevent an outward thrust of the same.

What is claimed is:—

In a belt-guide for automobile gas engines, the combination with a fan-belt and an engine casing, of a plate having means for attachment to the engine casing and two turned over edges at right angles with each other, one adapted to engage the side of the fan-belt and the other adapted to engage the outer edge of the same, the contour to that portion of the plate coming in close proximity with the engine casing being adapted to fit the contour of the engine casing to form a close and rigid connection therewith.

In testimony whereof, I affix my signature in the presence of two witnesses.

ALGY R. CRADDOCK.

Witnesses:
　J. S. McANDREW,
　L. L. WESTFALL.